US009600208B2

(12) United States Patent
Lu et al.

(10) Patent No.: US 9,600,208 B2
(45) Date of Patent: Mar. 21, 2017

(54) PASSIVE DETECTOR WITH NONVOLATILE MEMORY STORAGE

(71) Applicant: Palo Alto Research Center Incorporated, Palo Alto, CA (US)

(72) Inventors: JengPing Lu, Fremont, CA (US); Christopher L. Chua, San Jose, CA (US); Alan G. Bell, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 77 days.

(21) Appl. No.: 14/550,442

(22) Filed: Nov. 21, 2014

(65) Prior Publication Data

US 2016/0148024 A1   May 26, 2016

(51) Int. Cl.
*G06K 7/10* (2006.01)
*G06F 3/06* (2006.01)
*G06K 19/07* (2006.01)

(52) U.S. Cl.
CPC ....... *G06F 3/0679* (2013.01); *G06K 19/0717* (2013.01); *G06K 19/0708* (2013.01)

(58) Field of Classification Search
CPC . G01D 5/18; G01D 5/48; G06F 21/86; G06K 7/0008; G06K 19/0717; G06K 19/0723
See application file for complete search history.

(56) References Cited

U.S. PATENT DOCUMENTS

| 5,083,174 | A | | 1/1992 | Kub |
| 5,216,893 | A | * | 6/1993 | Santacatterina ........ F25B 49/02 236/94 |
| 5,386,158 | A | | 1/1995 | Wang |
| 5,739,541 | A | | 4/1998 | Kahilainen |
| 6,141,243 | A | | 10/2000 | Aslam et al. |

(Continued)

OTHER PUBLICATIONS

De Donno et al., "An UHF RFID Energy-Harvesting System Enhanced by a DC-DC Charge Pump in Silicon-on-Insulator Technology", IEEE Microwave and Wireless Components Letters, vol. 23, No. 6, pp. 3 315-317, Jun. 2013.

(Continued)

*Primary Examiner* — Nabil Syed
(74) *Attorney, Agent, or Firm* — Hollingsworth Davis, LLC

(57) ABSTRACT

A passive detector includes a sensor configured to sense an environmental parameter and to generate an output signal at an output of the sensor in response to the sensed environmental parameter. An energy scavenging circuit is coupled to the sensor, the energy scavenging circuit configured to convert a first voltage, $V_1$, across the sensor to a second voltage, $V_2$, where $V_2 > V_1$. A discriminator is powered by the second voltage and is coupled to the output of the sensor. A nonvolatile memory is coupled to an output of the discriminator. The discriminator is configured to compare the sensor output signal to a threshold and, in response to the sensor output signal being above the threshold, to provide a programming signal at the output of the discriminator. The programming signal is configured to cause data to be stored or erased in the nonvolatile memory.

17 Claims, 6 Drawing Sheets

(56) References Cited

U.S. PATENT DOCUMENTS

| | | | |
|---|---|---|---|
| 6,172,368 B1 | 1/2001 | Tarr et al. | |
| 6,720,866 B1* | 4/2004 | Sorrells | G06K 19/0717 340/10.34 |
| 7,462,512 B2 | 12/2008 | Levon et al. | |
| 7,932,828 B2 | 4/2011 | Britton, Jr. et al. | |
| 7,960,776 B2 | 6/2011 | Kim et al. | |
| 8,519,345 B2 | 8/2013 | Arsalan et al. | |
| 2006/0214789 A1 | 9/2006 | Posamentier et al. | |
| 2008/0211638 A1* | 9/2008 | Masui | G06K 7/0008 340/10.51 |
| 2010/0182147 A1* | 7/2010 | Rueping | G06F 21/86 340/541 |
| 2012/0068827 A1* | 3/2012 | Yi | G01D 5/18 340/10.1 |
| 2012/0287717 A1 | 11/2012 | Kuo | |
| 2014/0268963 A1* | 9/2014 | Yamada | H02M 1/34 363/124 |

OTHER PUBLICATIONS

Barranca et al., "Using a Floating-Gate MOS Transistor as a Transducer in a MEMS Gas Sensing System", Sensors, 2010, 22 pages.

Alvarez et al., "Total Ionizing Dose Characterization of a Prototype Floating Gate MOSEFET Dosimeter for Space Applications", IEEE Transactions on Nuclear Science, vol. 60, No. 6, pp. 4281-4288, Dec. 2, 2013.

* cited by examiner

PASSIVE DETECTOR WITH NONVOLATILE MEMORY STORAGE

TECHNICAL FIELD

This application relates generally to passive detectors that detect exposure to environmental parameters. The application also relates to components, systems, and methods pertaining to such detectors.

BACKGROUND

Many applications involve sensing environmental parameters and some of these applications are in locations where powered sensing is either not possible or desirable. The use of passive environmental detectors that do not require energy from batteries or other energy sources allows for remote sensing and/or logging of environmental exposure.

SUMMARY

Various embodiments described herein a passive detector that includes a sensor configured to sense an environmental parameter and, in response to the sensed environmental parameter, to generate an output signal at an output of the sensor. An energy scavenging circuit is coupled to the sensor, the energy scavenging circuit configured to convert a first voltage, $V_1$, across the sensor to a second voltage, $V_2$, where $V_2 > V_1$. A discriminator is powered by the second voltage and is coupled to the output of the sensor. The discriminator is configured to compare the sensor output signal to a threshold and, in response to the sensor output signal being above the threshold, to provide a programming signal at the output of the discriminator. The programming signal is configured to cause data to be stored or erased in a nonvolatile memory.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION

Embodiments disclosed herein relate to devices, systems, and methods for passively detecting environmental parameters, e.g., such as air, humidity, light, x-rays, and/or chemicals. The passive detectors discussed herein are capable of storing data indicating exposure of the detector to a threshold amount of the environmental parameter(s) of interest. Embodiments discussed herein can be implemented to provide a low cost and reliable approach for detection of exposure to environmental parameters. These concepts support a wide range of uses including packaging tamper/integrity indicators, intrusion detectors for electronic circuitry, temperature/humidity exposure detectors for perishable products and/or sterilization detectors, for example.

Figure 1A:
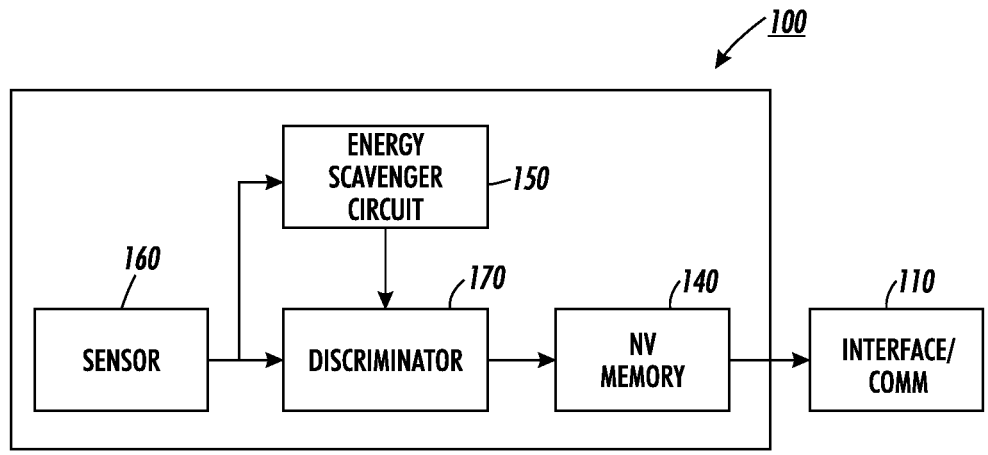
FIG. 1A is a block diagram of a passive detector implemented with one nonvolatile memory cell in accordance with some embodiments.

FIG. 1A is a block diagram of a passive detector 100 in accordance with some embodiments. The passive detector 100 is configured to detect an environmental parameter of interest and to store data indicating exposure to a threshold amount of the environmental parameter. The passive detector 100 is capable of detecting the environmental parameter and storing the data without being connected to an active source of power such as a power supply, battery, or other energy storage/power generation device.

The passive detector 100 includes at least one sensor 160 configured to sense an environmental parameter of interest and to generate an electrical output signal in response to the presence of the sensed environmental parameter. An energy scavenger circuit 150 coupled to the sensor 160 boosts the relatively weak output signal level of the sensor 160 to a higher signal level. For example, the energy scavenging circuit 150 may boost a first voltage having a first voltage value, $V_1$, present at the output of the sensor 160 to a second voltage having second voltage value, $V_2$, where $V_2 > V_1$.

A discriminator 170 includes an input coupled to the output of the sensor 160 and is powered by the output of the energy scavenging circuit 150. parameter. The signal level of the sensor output is dependent on the presence and/or amount of the sensed environmental The discriminator 170 is configured to compare the output signal of the sensor 160 to a threshold level and, in response to the sensor output signal being beyond the threshold level, to provide a programming signal to a nonvolatile memory 140, e.g. a single nonvolatile memory cell as shown in FIG. 1A. The programming signal has a level sufficient to store or erase data stored in the nonvolatile memory. Although generally described herein as flash memory, suitable types of nonvolatile memory include but are not limited to: floating gate (flash) memory, such as NAND and NOR flash, phase change memory (PCM), resistive random access memory RRAM, and magnetic random access memory MRAM.

In some scenarios, the level of the sensor output signal may decrease in response to the presence of the environmental parameter and, in these scenarios, the programming signal is provided by the discriminator when the sensor output signal decreases below the threshold level. In other scenarios, the level of the sensor output signal may increase in response to the presence of the environmental parameter and, in these scenarios, the programming signal is provided by the discriminator when the sensor output signal increases above the threshold level.

In some implementations, storage of data in the nonvolatile memory 140 may be triggered by exposure to a threshold dose of the environmental parameter. The exposure dosage of an environmental parameter is a function of both the amount of the environmental parameter and the amount of time of the exposure. Thus, exposure dosage can indicates exposure to a cumulative amount of the environmental parameter over a period of time.

The threshold level may be selected such that an expected amount of exposure or cumulative exposure dosage to the environmental parameter does not cause a change in the memory state of the nonvolatile memory. For example, the passive detector may be configured so that an x-ray dose when intentionally passing airport security check point can be will not trigger storage of the data whereas a single one time computed tomography (CT) scan will trigger the data storage.

The passive detector 100 may optionally be coupled to interface and/or communication circuitry 110. The interface/communication circuitry 110 is configured allow the memory state of the nonvolatile memory 140 to be read. The interface/communication circuitry can be configured to communicate with an external device, e.g., to transfer the stored data and/or other information such as an identification code for the passive detector 100 to an external device. In some implementations, power to operate the interface/communications circuitry 110 is provided inductively by a wireless interrogator, e.g., such as a radio frequency identification (RFID) interrogator. In some implementations, external power is applied directly to at least the nonvolatile memory and/or interface/communication circuitry to read the data stored in the memory cells.

In some embodiments, the passive detector may be configured to detect the presence of an environmental parameter within subranges of the environmental parameter. As one example, the passive detector may use an x-ray sensor configured to discriminate and/or be sensitive to a particular band of x-rays. Similar to a single photon counting instrument, each x-ray photon incident on the x-ray sensor generates a pulse of output signal wherein the amplitude of the output signal is proportional to the x-ray photon energy. In some embodiments, the discriminator may be configured to resolve the high frequency pulse train from the x-ray sensor and to use the pulse amplitude information to identify the type of x-ray exposure.

As another example, the sensor may comprise an acoustic/vibration sensor and the discriminator may be configured to determine frequency components of the vibration in the sensor output signal. The discriminator may be configured to determine if the event should be recorded in the nonvolatile memory based on the frequency components of the vibration.

Returning now to FIG. 1A, in some embodiments, the nonvolatile memory 140 comprises one nonvolatile memory cell, e.g., one flash memory cell based on floating gate technology. When the environmental parameter sensed by the sensor 160 is beyond the threshold of the discriminator 140, the discriminator 140 provides a programming signal to the memory cell having a level sufficient to change the memory state of the memory cell. For example, the programming signal provided at the output of the discriminator 140 is capable of changing the state of the memory cell 140 from a first state, e.g., an erased or binary "1" state, to a second state, e.g., programmed state or binary "0" state. In some implementations, the programming signal may be capable of changing the state of the memory cell from the first state to the second state and may not be capable of changing the state of the memory cell 140 from the second state to the first state. For example, a diode or other circuit component may be included at the output of the discriminator 140 to provide this feature. In such an implementation, the memory cell 140 is restricted to "write only mode" or "erase only mode," which enhances data integrity.

The nonvolatile memory 140 may comprise one single level memory cell capable of storing one bit of data. In this configuration, the presence of the environmental parameter of interest beyond the threshold level changes the state of the memory cell. For example, the memory cell 140 may initially be in a first state, e.g., an erased state. When the detector 100 is exposed to the environmental parameter equal to or beyond the threshold level, the programming signal output by the discriminator 150 operates to cause the memory cell 140 to change state from the first (erased) state to a second (programmed) state. Thus, data stored in one single level memory cell can provide information about whether or the sensor has been exposed to at least the threshold level of the environmental parameter (wherein the threshold level may involve both amount of environmental parameter and time of exposure) but the single data bit cannot provide additional information about an amount of exposure or dosage (amount of time and level) of exposure of the sensor 160 to the environmental parameter.

In some embodiments, the nonvolatile memory 140 may comprise a multiple level memory cell capable of storing multiple bits of data in one cell, e.g., two bits, three bits or more bits of data. A multiple level cell can provide information about the exposure of the sensor to the environmental parameter relative to multiple threshold levels. For example, consider a two bit memory cell which can store data values 00, 01, 10, or 11. In this scenario, data value 11 may indicate no exposure to the environmental parameter, and data values 10, 01, 00 may indicate low, medium, and high exposure levels.

Figure 1B:
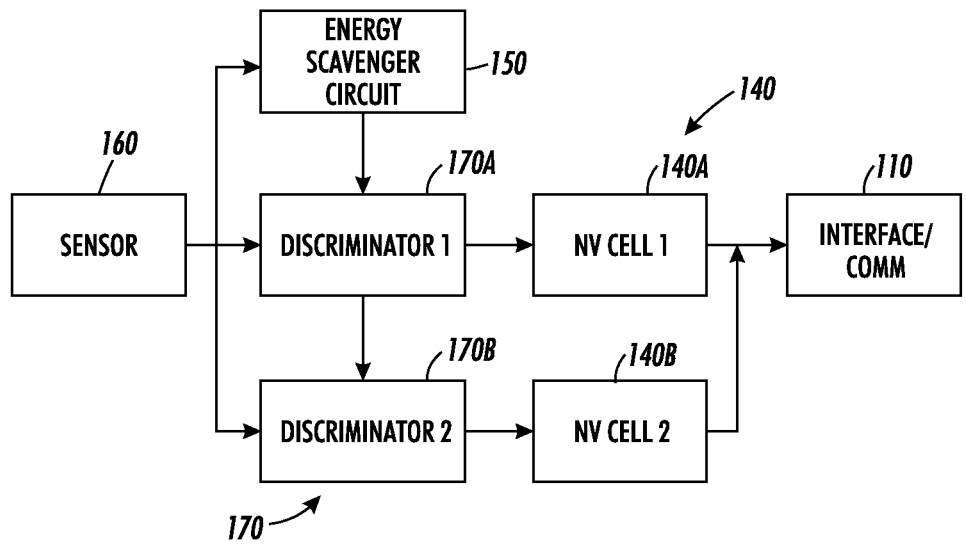
FIG. 1B is a block diagram of a passive detector implemented with multiple nonvolatile memory cells in accordance with some embodiments.

As shown in FIG. 1B, in some embodiments, the nonvolatile memory 140 may include multiple memory cells 140a, 140b, each memory cell capable of storing one or more bits of data. Each memory cell 140a, 140b has a different threshold level respectively controlled by discriminator elements 170a, 170b of discriminator 170. In the embodiment illustrated by FIG. 1B, each of the memory cells 140a, 140b may be capable of storing one bit of data such that the memory device is capable of representing up to four distinct values. In one scenario, when both NV memory cells 140a, 140b are in the 1 state, this indicates that the environmental parameter is not present or is present at a level below the first threshold level of discriminator 1; the the first NV memory cell in state 0 and the second NV memory cell in 1 state indicates that the environmental parameter is present at a level greater than the threshold level of discriminator 1, but less than the threshold level of discriminator 2; both the first NV memory cell and the second NV memory cell at state 0 indicates that the environmental parameter is present at level equal to or greater than the threshold level of discriminator 2.

Figure 1C:
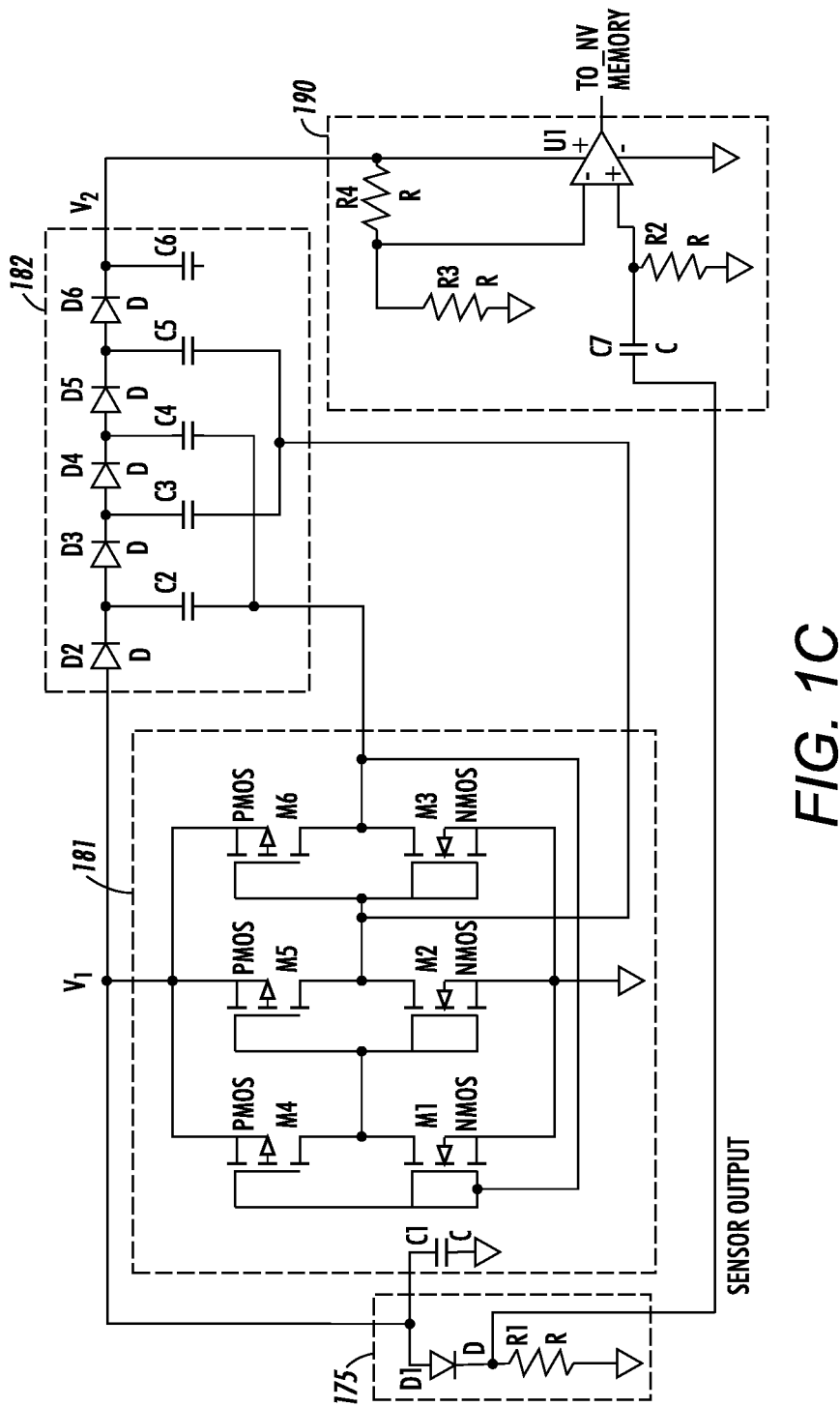
FIG. 1C is a circuit diagram of a passive detector in accordance with some embodiments.

FIG. 1C is a schematic diagram of a portion of a passive detector in accordance with some embodiments. The portion shown in FIG. 1C illustrates a portion of a sensor 175 which in this example is described as an x-ray sensor, an energy scavenging circuit 180 comprising circuit components 181 and 182, and discriminator 190. X-ray photons hit a scintillator and generate light pulses whose amplitude is proportional to the energy of the x-ray photon. The light pulses are sensed by photodiode D4 which converts the light energy to a current. The accumulated charge and energy is stored in capacitor C1, where $V_1$ is the voltage across the sensor 175 at capacitor C1 as shown in FIG. 1C. The voltage, $V_1$, generated at capacitor C1 due to current generated by the sensor 175 causes the ring oscillator 181 to oscillate. The oscillation generated by the ring oscillator 181 drives the charge pump 182 to generate a second voltage, $V_2$, at capacitor C6 that is greater than photodiode D1 open circuit voltage, and greater than $V_1$. The energy stored in capacitor C6 is used to power an operational amplifier-based discriminator 190. The sensor 175 generates a pulsing voltage at the sensor output across resistor R1 in response to x-ray photons. The pulsing voltage at R1 is capacitively coupled to the input of the operational amplifier U1 of discriminator 190 through capacitor C7. The operational amplifier U1 compares the level of the voltage pulses at the + input to the threshold level which is determined by resistors R4 and R3. If the level of the pulses is higher than the threshold level, the output of the operational amplifier U1 is sufficient to change the state of the NV memory (not shown in FIG. 1C).

In some scenarios, a passive detector can include interface circuitry that logically ORs the outputs of the nonvolatile memory cells. The output of the logical OR provides information about whether or not an environmental event occurred, but does not provide information about the type of environmental parameter that was sensed. In some scenarios, the outputs of the discriminators may be logically ORed with the result stored in a single nonvolatile memory cell.

In some embodiments, the interface/communication circuitry coupled to the passive detector is capable of establishing a wired or wireless communication link with an interrogator or other external system and is configured to transfer the data stored in the NV memory over the communication link when interrogated. In some embodiments, the passive detector communicates using radio frequency identification (RFID) communication technology. RFID communication technology wirelessly transfers data by magnetic fields over short distances by electromagnetic induction. The interrogator generates an electromagnetic field that inductively couples with the communication circuitry of the passive detector such the communication circuitry coupled to the passive detector operates as a passive transponder. RFID communication allows the communication circuitry to use energy from the interrogator signal to passively communicate the detector status. In other embodiments, power may be applied to the communication circuitry and/or NV memory allowing the NV memory to be interrogated by an external circuit. When powered is supplied for interrogation, wired or wireless communication between the passive detector and the external circuit can span many meters.

Figure 2:
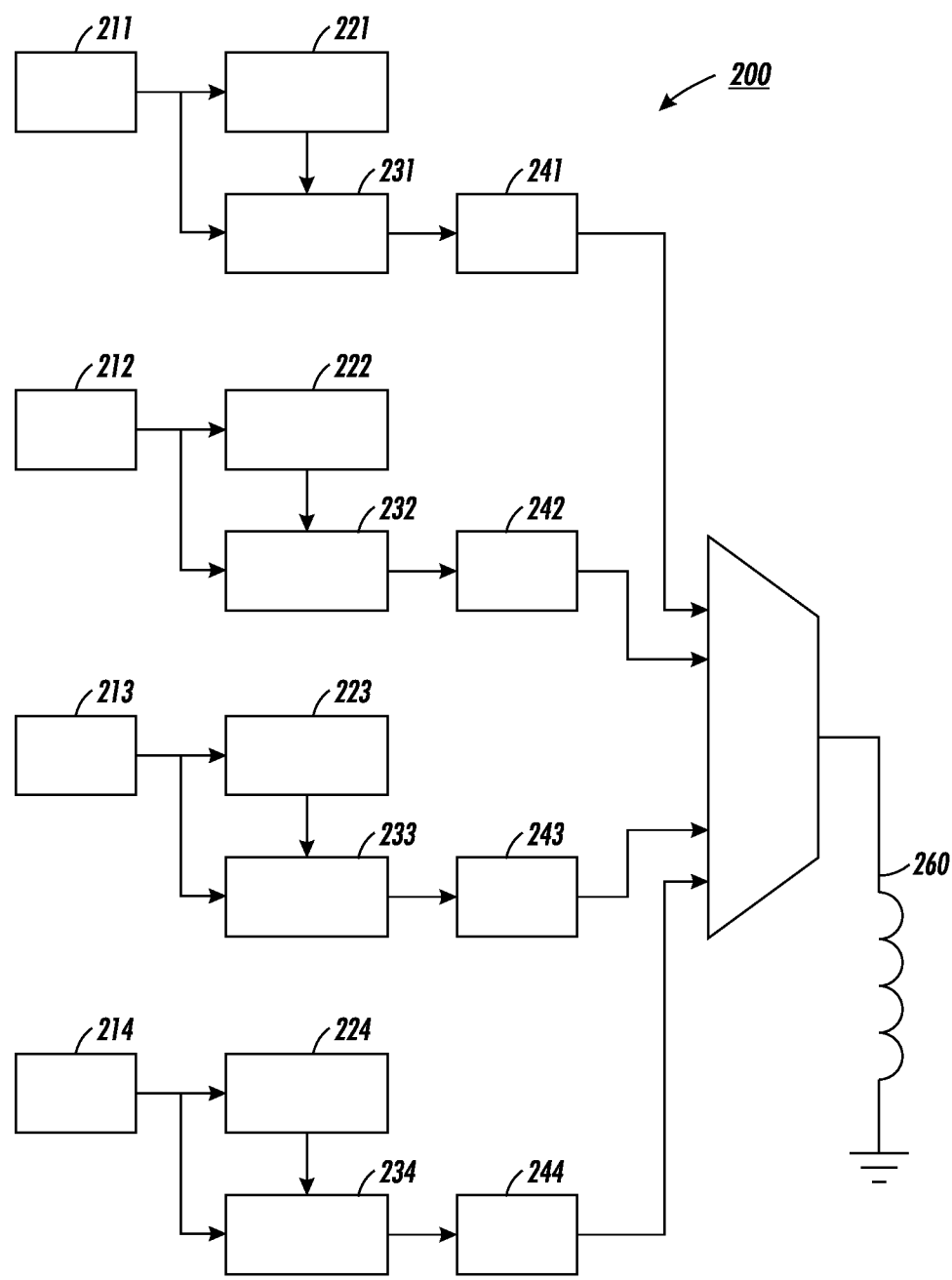
FIG. 2 illustrates an exemplary passive detector that uses four different sensor types to detect the occurrence of different environmental parameters.

FIG. 2 illustrates an exemplary passive detector 200 that uses four different sensor types to detect the presence of four different types of environmental parameters. Passive detector 200 includes a light sensor 211 comprising a PIN diode, an x-ray sensor 212 comprising a PIN diode with a scintillation layer, a chemical sensor 213, and a vibration sensor 214. Each sensor 211, 212, 213, 214 generates an electrical signal at its output in response to the presence of a sensed environmental parameter. Each of the sensor outputs are coupled to an energy scavenger circuit 221, 222, 223, 224 and to a discriminator 231, 232, 233, 234. The energy scavenger circuits 221, 222, 223, 224 are configured to provide power to the discriminators 231, 232, 233, 234 and can provide power to the nonvolatile memory for writing the data into the nonvolatile memory. In some embodiments, power to read the nonvolatile memory may be supplied by external circuitry.

The outputs of the discriminator are coupled respectively to an input of a flash memory cell 241, 242, 243, 244. The outputs of the memory cells 241, 242, 243, 244 are coupled to interface circuitry 250. In some embodiments, the interface circuitry 250 is powered by an external circuit. The interface circuitry 250 may be configured to read the ORed result of each memory cell and/or may be configured to read each memory cell individually. The passive detector 200 may include communication circuitry which is based on RFID technology comprising a coil 260 configured to facilitate communication with an interrogator (not shown in FIG. 2) by inductive coupling to the interrogator antenna. In embodiments described herein, all or some of the components of the passive detector as illustrated in FIGS. 1A, 1B, 1C, and 2 can be integrated onto a dielet, e.g., a silicon dielet.

Figure 3:
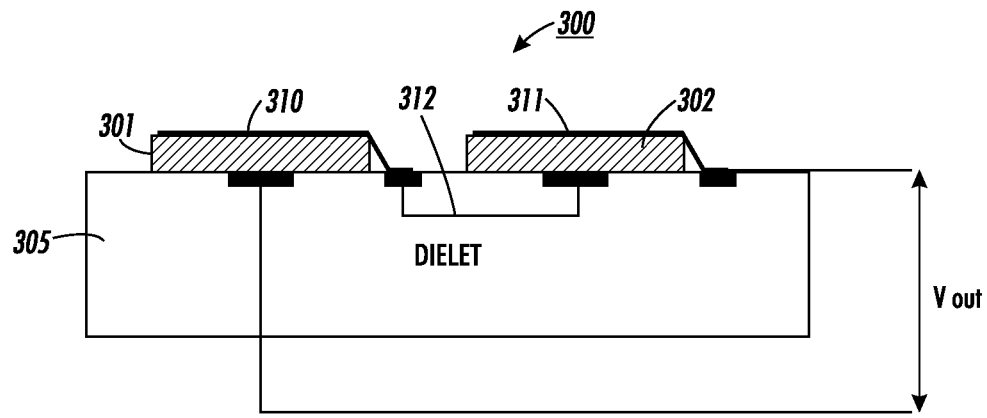
FIG. 3 shows a cross section of a light sensor that can be used in some embodiments of a passive detector.

FIG. 3 shows a cross section of a light sensor 300 that can be used in some implementations of a passive detector. The light sensor 300 includes two PIN photodiodes 301, 302 disposed on a dielet 305. For example, the PIN diodes 301, 302 may be formed of hydrogenated amorphous silicon (a-Si:H) disposed on a silicon dielet. The PIN diodes 301, 302 are operated as solar cells connected in series through connections 311, 312, 313 to increase the output programming voltage, Vout, of the sensor. It will be appreciated that additional PIN diodes could be connected in series (to further increase output voltage) and/or in parallel (to increase output current) if desired for a particular application. The PIN diodes can be deposited at low temperature (e.g., less than about 200 C) on standard Si CMOS wafers, with typical thicknesses in the 1 μm range. When used with no intentional bias, the PIN diodes behave similarly to solar cells, converting visible light to electrical energy with Voc in the 1 V range.

Figure 4:
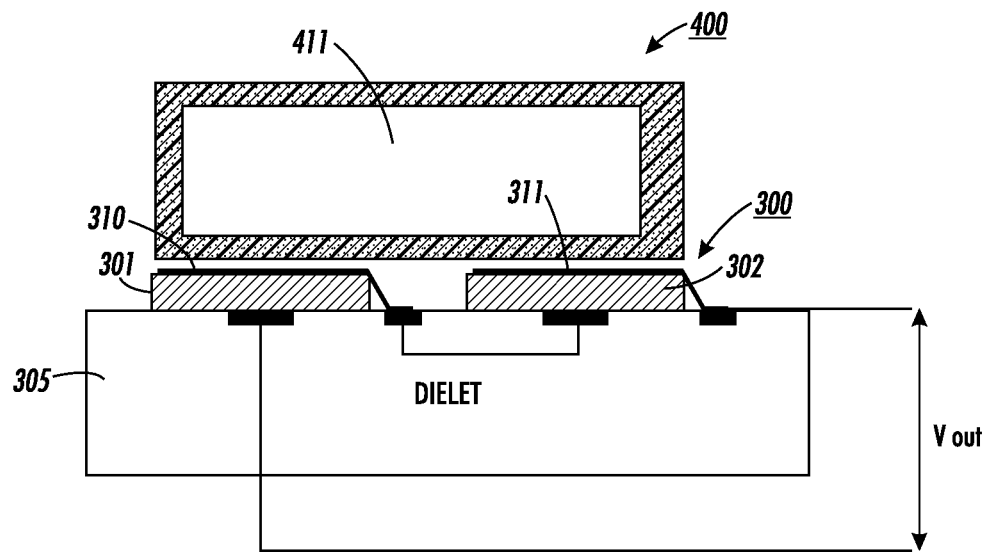
FIG. 4 shows a cross section of an x-ray sensor that can be used in some embodiments of a passive detector.

FIG. 4 illustrates a cross section of an x-ray sensor 400 that can be used in some implementations of a passive detector. The x-ray sensor 400 includes a light sensor 300 as discussed in connection with FIG. 3, with a scintillation layer 411, e.g., cesium iodide (CsI) deposited by thermal evaporation, disposed over the PIN photodiodes 301, 302. In some implementations, an x-ray photon, depending on the x-ray photon energy, can generate in the range of ten thousand visible photons, which are sensed by the PIN diodes 301, 302.

Figure 5:
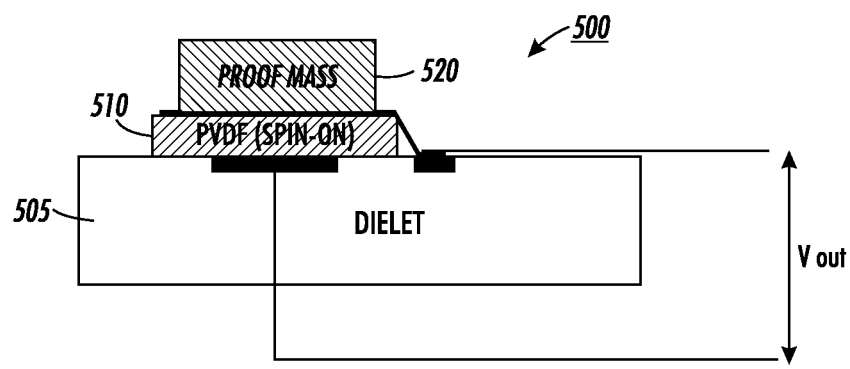
FIG. 5 shows a cross section of vibration sensor that can be used in some embodiments of a passive detector.

FIG. 5 shows a cross section of a vibration/acoustic sensor 500 that can be used in some implementations of a passive detector. Sensor 500 converts vibration to an output programming voltage at Vout. Piezoelectric material 510, such as polyvinylidene fluoride (PVDF) is spun on the finished CMOS dielet 505 and a proof mass 520 (e.g., a thin film metal) is deposited on the piezoelectric material 510 after the piezoelectric material is annealed and polled. The piezoelectric material 510 and proof mass 520 may have a combined thicknesses on the order of about 10 μm and can be readily integrated on CMOS dielets.

Figure 6:
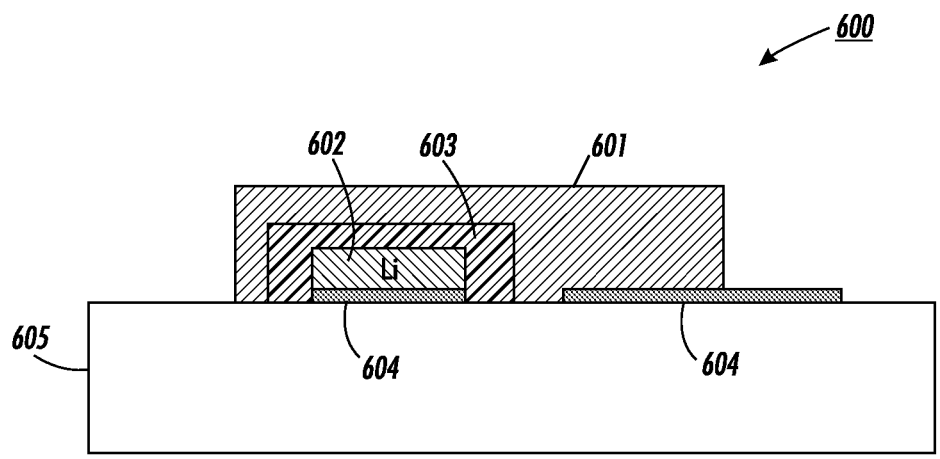
FIG. 6 shows a cross section of a chemical sensor that can be used in some embodiments of a passive detector.

FIG. 6 shows a cross section of a chemical sensor 600 with battery-like electrodes that can be used in some implementations of a passive detector. The chemical sensor 600 includes porous cathode 601, e.g., porous carbon or graphite and anode 602, e.g., lithium or zinc separated by a solid electrolyte material such as $Li_xPO_yN_z$. The cathode and anode materials are deposited on electrode layers 604, e.g., Cu electrode layers, disposed on a dielet 605. The electrolyte material 603 is activated by the presence of a chemical of interest, such as air, oxygen or water, which traverses the porous cathode to reach the electrolyte 603. Activation of the electrolyte 603 allows charge flow between the cathode and anode 601, 602, enabling current flow in the energy scavenging circuit.

Figure 7:
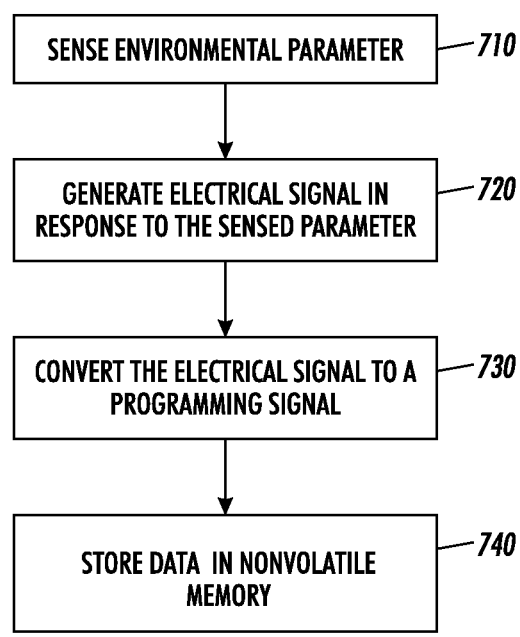
FIG. 7 is a flow diagram illustrating a method of passively detecting the presence of one or more environmental parameters in accordance with some embodiments.

The flow diagram of FIG. 7 illustrates a method of passively detecting the presence of an environmental parameter in accordance with various embodiments. One or more environmental parameters are sensed 710 and an electrical signal is generated 720 in response to the sensing. The electrical signal generated by the sensing is converted 730 to a signal level sufficient to store data 740 indicative of the level and/or dosage of the environmental parameter greater than a threshold level in nonvolatile memory. The data stored can be accessed by an interrogator, e.g., through a wired or wired communication link. In some embodiments the data only provides information about whether or not one of the environmental parameters sensed was present at or above the threshold level. In some embodiments, the data includes information about the type of environmental parameter sensed and/or the dose level (amount above and/or below the threshold dose) of the sensed environmental parameter.

In some embodiments, the passive detector may be implemented as an intrusion detector to detect intrusion events that may occur, for example, when a counterfeit component is installed in an electronic system, or when a used, authentic component is removed from an electronic system. These intrusion events are accompanied by exposure of system components to one or more environmental parameters, such as air, humidity, light, x-rays, and/or chemicals used to dissolve packaging. Embodiments discussed herein can be implemented to provide a low cost and reliable approach for detection of intrusion events based on sensing environmental parameters associated with intrusion. In some embodiments, the data stored in the nonvolatile memory indicative of intrusion is read when the protected component is powered up. In some of these embodiments, power is applied at least to the nonvolatile memory when the component is powered up and the data stored in the nonvolatile memory may be accessed under power, e.g., via a parallel or serial bus.

Embodiments disclosed herein relate to a passive environmental detector. The passive detector includes a sensor configured to sense an environmental parameter and to generate an output signal at an output of the sensor in response to the sensed environmental parameter. An energy scavenging circuit is coupled to the sensor, the energy scavenging circuit configured to convert a first voltage, $V_1$, across the sensor to a second voltage, $V_2$, where $V_2 > V_1$. A discriminator powered by the voltage provided by the energy scavenger circuit and is coupled to the output of the sensor. A nonvolatile memory is coupled to an output of the discriminator. The discriminator is configured to compare the sensor output signal to a threshold and, in response to the sensor output signal being above the threshold, to provide a programming signal at the output of the discriminator. The programming signal is sufficient to cause data to be stored or erased in the nonvolatile memory. In general, the nonvolatile memory may be any type of memory, such as flash memory. In some embodiments, the programming signal generated by the discriminator is capable of changing the state of the nonvolatile memory cell from a first binary state to a second binary state and is incapable of changing the state of the flash memory cell from the second binary state to the first binary state.

In some implementations, the discriminator comprises multiple discriminators and the nonvolatile memory comprises multiple memory cells, each memory cell coupled to one of the discriminators and capable of storing one bit of the data. The data stored in the multiple memory cells provide information about an amount of exposure of the sensor to the environmental parameter above or below the threshold.

In some implementations, the nonvolatile memory comprises at least one multi-level memory cell. The programming signal provided by the discriminator stores or erases data in the multi-level memory cell. The data stored in the multi-level memory cell provides information about an amount of exposure of the sensor to the environmental parameter above or below the threshold.

Examples of environmental sensors suitable for use in a passive detector include one or more of a PIN diode, an X-ray sensor, a vibration sensor; and a chemical sensor. For example, the passive detector may use two or more of these sensor types.

Examples nonvolatile memory types suitable for a passive detector include one or more of flash memory, phase change memory, resistive random access memory, and magnetic memory.

As discussed in more detail above, the energy scavenger circuit of the passive detector can include a ring oscillator configured to oscillate in response to the first voltage generated by the sensor and a charge pump configured to convert the first voltage to the second voltage in response to oscillation of the ring oscillator. In some implementations, the passive detector includes interface and/or communication circuitry configured to interface and/or communicate with an external circuit, e.g., an external interrogator configured to interrogate the passive detector to access the data stored in the nonvolatile memory. The interrogation circuitry is configured to wirelessly interrogate the passive detector and may provide power to facilitate the communication. For example, in some configurations, the interrogation circuitry is configured to interrogate the passive detector by magnetic induction using an electromagnetic field generated by the interrogation circuitry.

A method according to the embodiments disclosed herein involves passively detecting presence of an environmental parameter. The environmental parameter of interest is sensed using an appropriate sensor, the sensor generating a sensor output signal in response to sensing the environmental parameter. The energy scavenger circuit converts a first voltage, $V_1$, across the sensor to a second voltage, $V_2$, where $V_2 > V_1$. The discriminator is powered using the second voltage and compares the sensor output signal to a threshold. In response to the sensor output being above the threshold, the discriminator generates a programming signal configured to cause data to be stored or erased in a nonvolatile memory.

In some implementations, the passive detector is disposed on a component that includes protected circuitry and detects attempt to tamper with the protected circuitry.

Systems, devices, or methods disclosed herein may include one or more of the features, structures, methods, or combinations thereof described herein. For example, a device or method may be implemented to include one or more of the features and/or processes described herein. It is intended that such device or method need not include all of the features and/or processes described herein, but may be implemented to include selected features and/or processes that provide useful structures and/or functionality.

In the above detailed description, numeric values and ranges are provided for various aspects of the implementations described. These values and ranges are to be treated as examples only, and are not intended to limit the scope of the claims. For example, embodiments described in this disclosure can be practiced throughout the disclosed numerical ranges. In addition, a number of materials are identified as suitable for various implementations. These materials are to be treated as exemplary, and are not intended to limit the scope of the claims.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A passive detector comprising:
a sensor configured to sense an environmental parameter and to generate an output signal at an output of the sensor in response to the sensed environmental parameter;
an energy scavenging circuit coupled to the sensor, the energy scavenging circuit configured to convert a first voltage, $V_1$, across the sensor to a second voltage, $V_2$, where $V_2 > V_1$;
a discriminator powered by the second voltage and coupled to the output of the sensor; and
a nonvolatile memory coupled to an output of the discriminator, wherein the discriminator is configured to compare the sensor output signal to a threshold and, in response to the sensor output signal being above the threshold, to provide a programming signal at the output of the discriminator, the programming signal configured to cause data to be stored or erased in the nonvolatile memory wherein the discriminator comprises multiple discriminators;
the nonvolatile memory comprises multiple memory cells, each memory cell coupled to at least one of the multiple discriminators and capable of storing one bit of the data;
the data stored in the multiple memory cells provide information about an amount of exposure of the sensor to the environmental parameter above or below the threshold.

2. The passive detector of claim 1 wherein the nonvolatile memory comprises at least one flash memory cell.

3. The passive detector of claim 1 wherein the programming signal is capable of changing a state of a nonvolatile memory cell of the nonvolatile memory from a first binary state to a second binary state and is incapable of changing the state of the nonvolatile memory cell from the second binary state to the first binary state.

4. The passive detector of claim 1 wherein:
the nonvolatile memory comprises at least one multi-level memory cell; and
the programming signal stores or erases data in the multi-level memory cell; and
the data stored in the multi-level memory cell includes information about an amount of exposure of the sensor to the environmental parameter above or below the threshold.

5. The passive detector of claim 1 wherein the at least one sensor comprises one of:
a PIN diode;
an X-ray sensor;
a vibration sensor; and
a chemical sensor.

6. The passive detector of claim 1 wherein the at least one sensor comprises two or more of:
a PIN diode;
an X-ray sensor;
a vibration sensor; and
a chemical sensor.

7. The passive detector of claim 1 wherein the nonvolatile memory comprises one of:
flash memory;
phase change memory;
resistive random access memory; and
magnetic memory.

8. The passive detector of claim 1 wherein the energy scavenger circuit comprises:
a ring oscillator configured to oscillate in response to the first voltage; and
a charge pump configured to convert the first voltage to the second voltage in response to oscillation of the ring oscillator.

9. The passive detector of claim 1 wherein the passive detector comprises communication circuitry configured to communicate with an external interrogator.

10. A system, comprising:
a passive detector comprising:
a sensor configured to sense an environmental parameter and to generate an output signal at an output of the sensor in response to the sensed environmental parameter;
an energy scavenging circuit coupled to the sensor, the energy scavenging circuit configured to convert a first voltage, $V_1$, across the sensor to a second voltage, $V_2$, where $V_2 > V_1$;
a discriminator powered by the second voltage and coupled to the output of the sensor; and
a nonvolatile memory coupled to an output of the discriminator, wherein the discriminator is configured to compare the sensor output signal to a threshold and, in response to the sensor output signal being above the threshold, to provide a programming signal at the output of the discriminator, the programming signal configured to cause data to be stored or erased in the nonvolatile memory; and
interrogation circuitry configured to interrogate the passive detector to access the data stored in the nonvolatile memory wherein the discriminator comprises multiple discriminators;
the nonvolatile memory comprises multiple memory cells, each memory cell coupled to at least one of the multiple discriminators and capable of storing one bit of the data;
the data stored in the multiple memory cells provide information about an amount of exposure of the sensor to the environmental parameter above or below the threshold.

11. The system of claim 10, wherein the interrogation circuitry is configured to wirelessly interrogate the passive detector.

12. The system of claim 10, wherein the interrogation circuitry is configured to interrogate the passive detector by magnetic induction using an electromagnetic field generated by the interrogation circuitry.

13. The system of claim 10, wherein the passive detector is an intrusion detector disposed on a component that includes protected circuitry.

14. A method of passively detecting presence of an environmental parameter, comprising:
sensing an environmental parameter using a sensor;
generating a sensor output signal in response to sensing the environmental parameter;
converting a first voltage, $V_1$, across the sensor to a second voltage, $V_2$, where $V_2 > V_1$;
powering a discriminator using the second voltage;

comparing in the discriminator the sensor output signal to a threshold; and in response to the sensor output signal being above the threshold, generating a programming signal configured to cause data to be stored or erased in a nonvolatile memory wherein the discriminator comprises multiple discriminators;

the nonvolatile memory comprises multiple memory cells, each memory cell coupled to at least one of the multiple discriminators and capable of storing one bit of the data;

the data stored in the multiple memory cells provide information about an amount of exposure of the sensor to the environmental parameter above or below the threshold.

15. The method of claim 14, wherein sensing the environmental parameter comprises sensing one or more of light;

x-rays;

vibration; and presence of a chemical.

16. The method of claim 14, further comprising transferring the data to an interrogator through a wired or wireless communication link.

17. The method of claim 14, wherein the data comprises multi-bit data that includes information about an amount of exposure to the environmental parameter above the threshold.

* * * * *